E. NORDLUND.
ROLLER BEARING.
APPLICATION FILED OCT. 18, 1919.

1,344,276.

Patented June 22, 1920.
2 SHEETS—SHEET 1.

INVENTOR :
Erland Nordlund
By Attorneys,

UNITED STATES PATENT OFFICE.

ERLAND NORDLUND, OF STOCKHOLM, SWEDEN, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,344,276.

Specification of Letters Patent.   Patented June 22, 1920.

Application filed October 18, 1919. Serial No. 331,732.

*To all whom it may concern:*

Be it known that I, ERLAND NORDLUND, a subject of the King of Sweden, residing at Stockholm, in the Kingdom of Sweden, have invented new and useful Improvements in Roller-Bearings, of which the following is a specification.

This invention relates to roller bearings having conical rollers and so-called Timken-guides for the rollers. In some roller bearings of this kind the rollers are provided at their larger ends with enlargements or heads bearing against flanges formed on the bearing rings. In order to reduce in each bearings the friction between the rollers and the supporting flanges of the bearing rings and to prevent oblique displacement of the rollers, it has been proposed to limit the contact between the rollers and the supporting flanges, practically taken, to one point only and to place this point in the extension of a generatrix of the conical superficies of the roller.

The object of the invention is, while maintaining small friction and reliable guiding of the rollers, to obtain a simpler and cheaper manufacture of the bearing than hitherto and to effect the filling of all the rollers without using a filling opening or the like, the usual supporting flange on the bearing ring or rings being omitted altogether.

The invention consists, chiefly, in this, that the enlarged portion of the roller bears against a cylindrical surface on the inner side of the outer bearing ring. Said portion of the roller may, preferably, be formed by a curved generatrix, the contact between said portion of the roller and the cylindrical surface of the bearing ring thus being limited to one point preferably located in the extension of a generatrix of the conical superficies of the roller.

Figure 1:
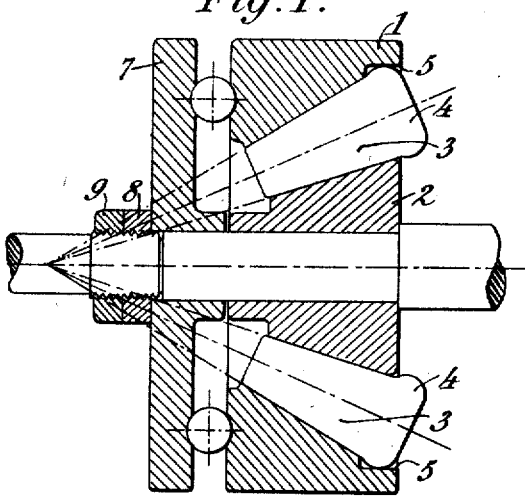
Figure 2:
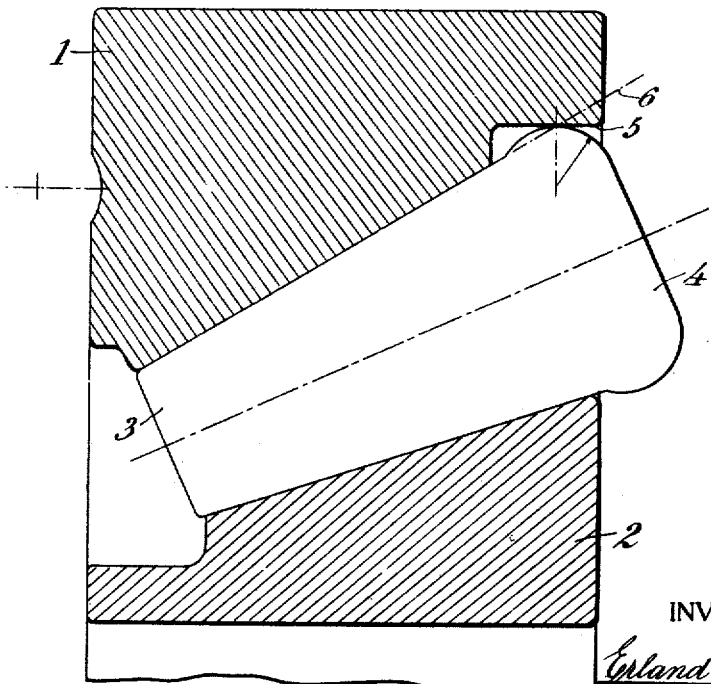

In the drawing two embodiments of the invention are illustrated. Figure 1 is a cross-section of a roller bearing having one row of rollers. Fig. 2 is a cross-section on an enlarged scale of a portion of same bearing, and Fig. 3 is a cross-section of a bearing having two rows of rollers.

Referring to Figs. 1 and 2, the roller bearing consists of an undivided outer bearing ring 1, an undivided inner bearing ring 2 and conical rollers 3 inserted between said bearing rings and the apices of which are positioned in the axis of the bearing. At the outer end each of the rollers 3 is provided with a guiding head 4 having greater diameter than the remaining part of the roller and formed by a curved generatrix preferably an arc, as shown in Fig. 2. The heads 4 of the rollers bear against a cylindrical surface 5 on the inner side of the outer bearing ring 1 at a point positioned in the extension 6 of the generatrix of the conical superficies of the roller.

Axial thrusts in the direction from the right to the left in Fig. 1 are taken up by the conical rollers, whereas axial thrusts in opposite direction are taken up by a thrust ball bearing, one bearing ring of which consists of the outer bearing ring 1 of the roller bearing. The other bearing ring 7 of said thrust bearing is by means of nuts 8 and 9 clamped in fixed relation to the inner bearing ring 2 of the roller bearing. If desired, the bearing rings 2 and 7 may be connected by an inner socket riveted at the ends, the whole bearing thus forming a self-contained unit.

Figure 3:
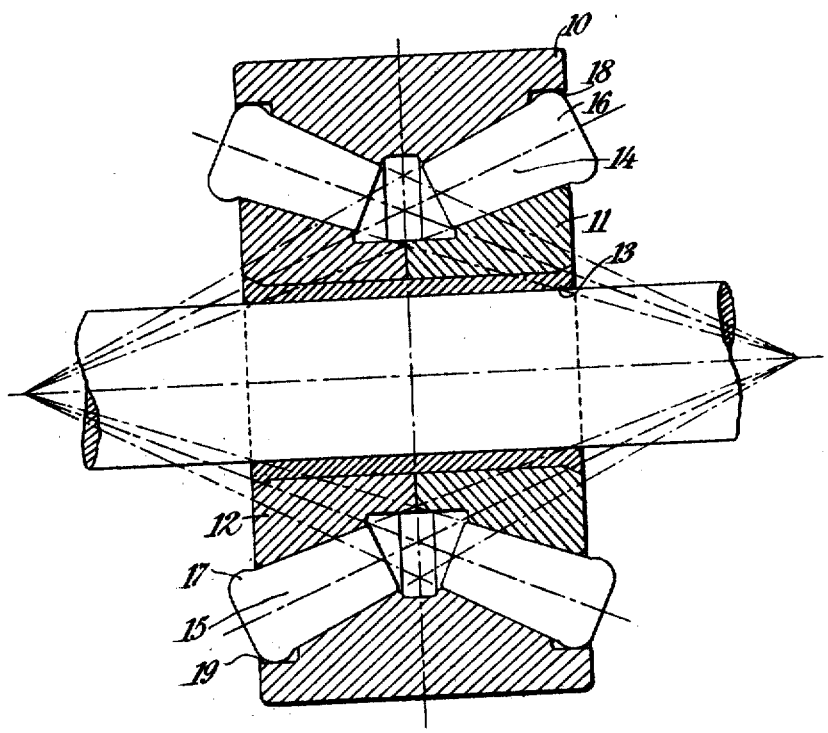

In the roller bearing shown in Fig. 3 and having two rows of rollers the outer ring 10 forms a single piece, whereas the inner ring consists of two parts 11 and 12 kept together by an inner socket 13 riveted at the ends, the bearing thus forming a self-contained unit. The conical rollers 14 and 15 are arranged in the same manner as in the bearing shown in Figs. 1 and 2, the heads 16 and 17 bearing against inner cylindrical surfaces 18 and 19 on the outer bearing ring at a point positioned in the extension of the generatrix of the curved superficies of the roller. If desired, the inner ring may be made in one piece and the outer ring may consist of two parts.

What I claim is:—

1. A roller bearing, comprising an inner bearing ring, an outer bearing ring having conical and cylindrical races, and conical rollers having guiding heads of greater diameter than the conical surface of the rollers, said guiding heads being in contact with the cylindrical race of the outer bearing ring.

2. A roller bearing, comprising an inner bearing, an outer bearing ring having conical and cylindrical races, and conical rollers having guiding heads of greater diameter than the conical surface of the rollers, said guiding heads having point contact only with the cylindrical race of the outer bearing ring.

3. A roller bearing, comprising an inner bearing ring, an outer bearing ring having conical and cylindrical races, and conical rollers having guiding heads the surfaces of which are formed with a curved generatrix and are adapted to run in contact with the cylindrical race of the outer bearing ring.

4. A roller bearing, comprising an inner bearing ring, an outer bearing ring having conical and cylindrical races, and conical rollers having guiding heads the surfaces of which are formed with a curved generatrix and are adapted to run in contact with the cylindrical race of the outer bearing ring, the contact between each head and said race being limited to one point only positioned in the extension of a generatrix of the conical surface of the roller.

5. A combined radial and thrust roller bearing, comprising an outer bearing ring having conical and cylindrical inner races and a side race, an inner bearing ring, conical rollers having guiding heads the surfaces of which are adapted to run in contact with said cylindrical race, and means for taking up axial thrust in direction opposite to that received by said rollers.

6. A combined radial and thrust roller bearing, comprising an integral outer bearing ring having opposite conical races and cylindrical side races, an inner bearing ring made in two parts having opposed conical races and attached to each other, and two sets of conical rollers having guiding heads the surfaces of which are adapted to run in contact with said cylindrical races, said bearing adapted to resist axial thrusts in both directions.

7. A roller bearing, comprising an inner bearing ring, an outer bearing ring having conical and cylindrical races, and two rows of conical rollers having convex heads in contact with said cylindrical races.

8. A roller bearing, comprising a divided inner bearing ring, an integral outer bearing ring having conical and cylindrical races, and two rows of conical rollers having convex heads in contact with said cylindrical races.

In testimony whereof I have signed my name.

ERLAND NORDLUND.